(12) United States Patent
Hofmann et al.

(10) Patent No.: US 10,604,130 B2
(45) Date of Patent: Mar. 31, 2020

(54) VACUUM BRAKE BOOSTER COMPRISING REINFORCED HOUSING

(71) Applicant: Lucas Automotive GmbH, Koblenz (DE)

(72) Inventors: Martin Hofmann, Mending (DE); Georg Brand, Nachtsheim (DE); José Manuel Calvo Martinez, Kruft (DE)

(73) Assignee: Lucas Automotive GmbH, Koblenz (DE)

( * ) Notice: Subject to any disclaimer, the term of this patent is extended or adjusted under 35 U.S.C. 154(b) by 213 days.

(21) Appl. No.: 15/551,048

(22) PCT Filed: Jan. 13, 2016

(86) PCT No.: PCT/EP2016/050494
§ 371 (c)(1),
(2) Date: Aug. 15, 2017

(87) PCT Pub. No.: WO2016/131564
PCT Pub. Date: Aug. 25, 2016

(65) Prior Publication Data
US 2018/0037204 A1    Feb. 8, 2018

(30) Foreign Application Priority Data

Feb. 16, 2015 (DE) .................. 10 2015 001 944

(51) Int. Cl.
*B60T 13/567* (2006.01)
(52) U.S. Cl.
CPC ................... *B60T 13/567* (2013.01)
(58) Field of Classification Search
CPC ....... B60T 13/567; B60T 13/565; B60T 13/52
See application file for complete search history.

(56) References Cited

U.S. PATENT DOCUMENTS 4,434,707 A * 3/1984 Takeuchi ............. B60T 13/567
                                                                91/376 R
4,445,331 A    5/1984 Weiler et al.
(Continued)

FOREIGN PATENT DOCUMENTS

CN     102815289 A    12/2018
DE       3031206 A1     4/1982
(Continued)

OTHER PUBLICATIONS

PCT International Search Report and the Written Opinion, Application No. PCT/EP2016/050494 filed Jan. 13, 2016, dated Apr. 13, 2016.

(Continued)

*Primary Examiner* — Michael Leslie
*Assistant Examiner* — Dustin T Nguyen
(74) *Attorney, Agent, or Firm* — MacMillan, Sobanski & Todd, LLC

(57) ABSTRACT

A vacuum brake booster for a motor vehicle brake system, comprising a housing having axially opposing end wall regions which are connected together via a peripheral region, wherein the end wall regions each comprise at least one receiving opening for receiving components introducing braking force or releasing braking force, wherein at least one reinforcing rib is formed in at least one end wall region. According to the invention, the reinforcing rib extends outside of an inner circle arranged concentric to the receiving opening and spans an inner circle segment which encloses an angle of at least approximately 60° and at most approximately 180°.

14 Claims, 2 Drawing Sheets

(56) References Cited

U.S. PATENT DOCUMENTS

| | | | |
|---|---|---|---|
| 4,492,081 A | 1/1985 | Weiler et al. | |
| 4,538,439 A | 9/1985 | Frei | |
| 4,542,680 A * | 9/1985 | Takeuchi | B60T 13/569 |
| | | | 91/369.2 |
| 4,604,944 A * | 8/1986 | Tsubouchi | B60T 13/567 |
| | | | 92/98 D |
| 7,712,570 B2 * | 5/2010 | Miller | B60R 21/09 |
| | | | 180/274 |
| 10,077,035 B2 * | 9/2018 | Suzuki | B60T 13/567 |
| 2010/0132543 A1 * | 6/2010 | Nakamura | B60T 13/567 |
| | | | 91/369.1 |
| 2012/0304849 A1 | 12/2012 | Tanizawa et al. | |

FOREIGN PATENT DOCUMENTS

| | | | | |
|---|---|---|---|---|
| DE | 3041883 A1 | | 6/1982 | |
| DE | 9102285 U1 | | 5/1991 | |
| DE | 19930886 A1 | | 1/2001 | |
| DE | 102010001812 A1 | * | 10/2010 | B60T 13/567 |
| DE | 102010001812 A1 | | 10/2010 | |
| EP | 0094344 A2 | | 11/1983 | |
| JP | S6067252 | * | 4/1985 | B60T 13/567 |

OTHER PUBLICATIONS

Chinese Office Action, Application No. 201680010153.1, dated Dec. 29, 2018.

* cited by examiner

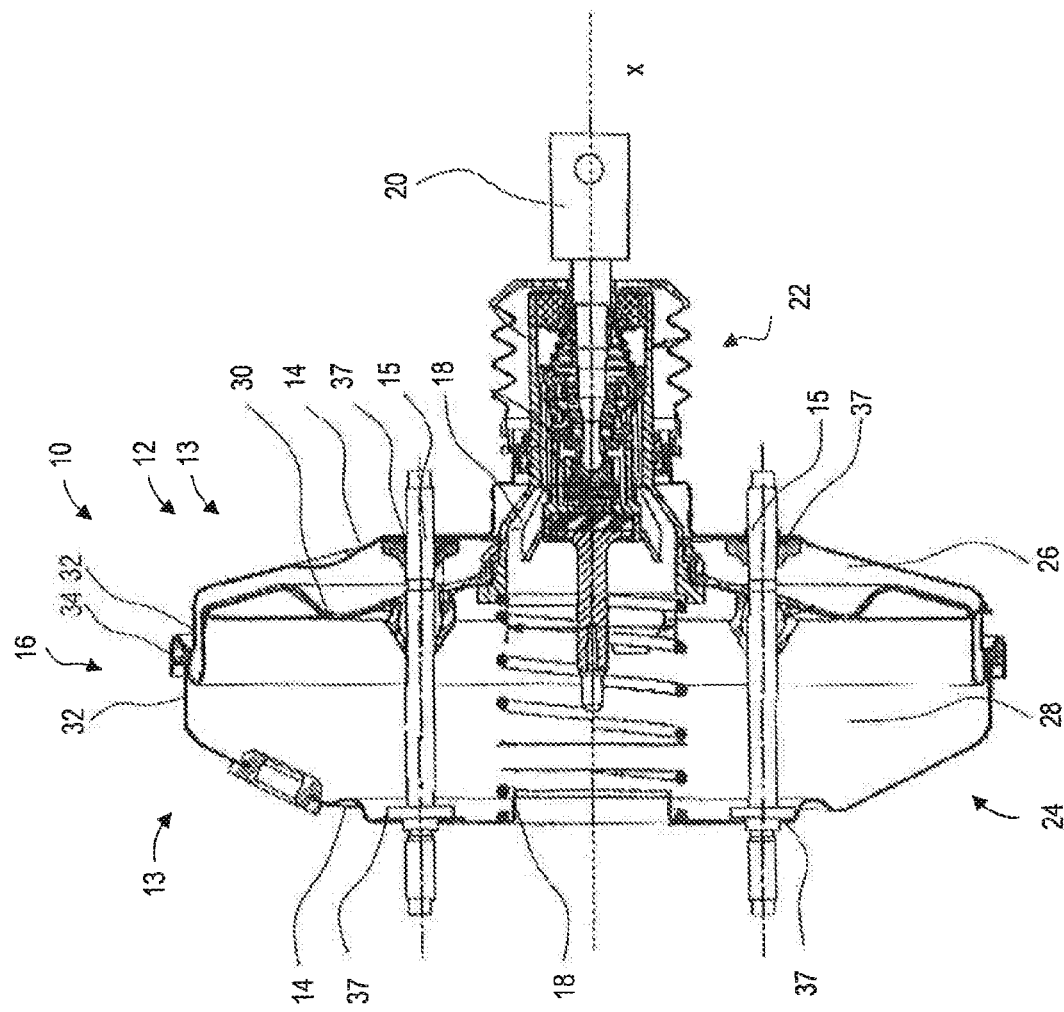
Fig. 3 – Prior art

VACUUM BRAKE BOOSTER COMPRISING REINFORCED HOUSING

CROSS-REFERENCE TO RELATED APPLICATIONS

This application is a national stage of International Application No. PCT/EP2016/050494, filed 13 Jan. 2016, the disclosures of which are incorporated herein by reference in entirety, and which claimed priority to German Patent Application No. 10 2015 001 944.9, filed 16 Feb. 2015, the disclosures of which are incorporated herein by reference in entirety.

BACKGROUND OF THE INVENTION

The present invention relates to a vacuum brake booster for a vehicle brake device, comprising a casing with axially opposed end wall sections which are connected to each other through a circumferential section, wherein the end wall sections each have at least one receiving opening for receiving components for receiving a brake force or components for releasing a brake force, wherein at least one stiffening bead is provided in at least one end wall section.

Such vacuum brake boosters are known from the prior art and are disclosed, for example, in documents DE 30 31 206 A1, DE 30 41 883 A1 and DE 10 2010 001 812 A1. The vacuum brake boosters are thereby provided in the interior of the casing typically with a chamber arrangement, in which a working chamber and a vacuum chamber are separated by a movable separating wall. The position of the separating wall can be changed according to the excursion of a component for receiving a brake force, for example by the displacement of a force input member on operation of a brake pedal. In known manner, pressure differences thereby occur at the separating wall, which permit servo assistance of the braking process.

The casings of vacuum brake boosters are typically composed of two shell-like casing halves which have a substantially circular outline. The casing halves further have an end wall section forming a base area, which is followed, at an angle, by a circumferential section surrounding the end wall section. The casing halves are arranged axially opposite one another, when seen along an operating axis of the components for receiving a brake force or for releasing a brake force, so that the ring sections can be connected to one another in a sealing manner and define the circumferential section of the casing.

Target parameters in the construction of such vacuum brake boosters are in particular the production costs and the overall weight, each of which is to be kept as low as possible. One possible method of achieving those target parameters consists in forming the casing from materials that are as thin-walled as possible, in particular from thin-walled metal sheets. However, a reduction in the material thickness can be accompanied by a loss of stability or stiffness of the casing. This is critical because the casing must withstand the pressure differences in its interior. Likewise, it must be designed to compensate for different mechanical loads, for example in cases in which the components for receiving a brake force or for releasing a brake force bear against the casing.

In order to resolve this conflict of targets, it is known from the documents mentioned at the beginning to provide stiffening beads in the end wall sections of a vacuum brake booster casing. Document DE 30 31 206 A1 thus discloses a casing which has in its end wall section a flat central portion and a truncated-cone-shaped casing portion surrounding it. In the truncated-cone-shaped portion there are arranged radial beads for stiffening the casing end walls.

Similarly, document DE 30 41 883 A1 teaches the provision of radial beads in a truncated-cone-shaped outer section of a casing end wall. Deep-drawn ribs are likewise arranged in the region of the receiving opening, which ribs form a complex branched lattice which surrounds the receiving opening completely.

Radial beads in a truncated-cone-shaped outer section of a housing end wall are also known from document DE 10 2010 001 812 A1. Adjacent radial beads can thereby also be connected at their ends close to the receiving opening by means of a bead extending in the circumferential direction. The degree of extension in the circumferential direction is relatively small.

It has been shown that sufficiently great weight and cost savings cannot be achieved with these known variants. In addition, the required stiffness of the brake booster casing cannot be ensured with sufficient reliability.

BRIEF SUMMARY OF THE INVENTION

Accordingly, the feature of the present invention is to provide a vacuum brake booster of the type described at the beginning which is inexpensive to produce, has a low weight and is sufficiently stable.

This feature is achieved by a vacuum brake booster for a vehicle brake device, in which it is provided that the stiffening bead extends outside of an inner circle which is arranged concentrically with respect to the receiving opening and spans an inner circle segment which includes an angle of at least approximately 60° and at most approximately 180°.

In contrast to the known variants from the prior art, it is provided according to the invention that the stiffening bead extends over a defined region in the circumferential direction which exceeds the extension regions of the conventional purely radial beads or radial beads connected with a circumferential portion. At the same time, it is provided according to the invention that the stiffening bead does not completely encircle or surround the receiving opening. To the contrary, the inventors have recognized that, by forming the stiffening bead in the manner mentioned above, it is possible to achieve a particularly good compromise of as small a material thickness as possible and a sufficiently stable casing.

According to the invention it can be provided in particular that the stiffening bead spans an inner circle segment which includes an angle of at least approximately 100° and at most approximately 160°. Likewise, it can be provided according to the invention that the included angle is between at least approximately 110° and at most approximately 140°.

A further development of the invention provides that the stiffening bead extends substantially within a flat portion of the end wall section, wherein the flat portion is oriented substantially perpendicularly to an operating axis of the components for receiving a brake force or components for releasing a brake force. In contrast to the known solutions according to the prior art, this allows the stiffening bead to be arranged as close as possible to the receiving opening and not in a truncated-cone-shaped outer region spaced apart therefrom. It can further be provided according to the invention that the stiffening bead is formed with a rounded, rectangular or V-shaped cross-section. It can preferably be provided that the stiffening bead, when seen from inside the casing, protrudes outwards from the plane of the end wall section. This can be achieved by pressing the stiffening bead out of a plane of the end wall section towards an outer side of the casing within the scope of a shaping process. The shaping tool can advantageously be formed with a rounded, angled or V-shaped contour.

It can further be provided according to the invention that the stiffening bead extends linearly between two end points, wherein the end points are arranged in particular on or close to the inner circle. The stiffening beads can likewise be extensive, but preferably with a small width in the radial direction.

A further development of the invention provides that the stiffening bead extends substantially in the circumferential direction. According to this variant, the stiffening bead has regions extending predominantly in the circumferential direction or is even completely free of portions extending purely radially. For example, it can be provided that the course of the stiffening bead in the plane of the end wall section has for the most part or at every point a curvature which contains a directional component in the circumferential direction. The inventors have recognized that the desired improvements in stiffness can be achieved particularly effectively by an extension predominantly in the circumferential direction.

It can further be provided according to the invention that the extension of the stiffening bead describes an open contour. In other words, it can be provided that the course of the stiffening bead in the plane of the end wall section describes a contour which does not form a closed profile. Accordingly, the stiffening bead can describe a C- or U-shaped contour in the end wall section but not a closed contour, such as, for example, an O- or D-shaped contour. The desired improvements in stiffness can reliably be achieved by this measure too.

A further development of the invention provides that the stiffening bead has a course which is curved substantially radially outwards. In particular, it can be provided that the stiffening bead is substantially concave, relative to the receiving opening. The extension of the stiffening bead in the end wall section can describe, for example, substantially a C-shaped contour, wherein the upper and lower legs of the C-shaped contour face the receiving opening. It has been shown that the conflict of targets described at the beginning can be resolved particularly well with a stiffening bead of such a form.

A further development of the invention provides that the stiffening bead is substantially without branches. Accordingly, it can be provided that the stiffening bead extends substantially linearly along a longitudinal axis and in particular has no radial branches. It has been shown that undesirable stress concentrations at the branching points can thereby be avoided and the desired improvements in stiffness can reliably be achieved.

According to a further development of the invention it can be provided that the stiffening bead extends with a curvilinear course along a longitudinal center axis. The longitudinal center axis can in particular be linear and the stiffening bead can extend in the context of its curvilinear course above and below (or radially inside and outside) the longitudinal center axis and/or can cross it. In other words, it can be provided that the stiffening bead changes its degree of curvature locally along its course but always extends along the longitudinal center axis. Figuratively speaking, this further development provides that the course of the stiffening bead "oscillates" about the longitudinal center axis. The longitudinal center axis can in particular be so arranged that the stiffening bead extends in equal proportions above and below the longitudinal center axis. Overall, the longitudinal center axis can thus define the substantial extension, or the main extension from a macroscopic point of view, of the stiffening bead within the end wall section.

In this connection it can further be provided according to the invention that the longitudinal center axis forms a circular arc segment. The circular arc segment can in particular be arranged concentrically with respect to the inner circle.

In a further development of the invention it is provided that the stiffening bead extends between at least two end points and is provided close to at least one end point with at least one sub-portion which is curved about a radial axis of curvature. According to this variant it can be provided that the stiffening bead changes its curvature behavior close to the end points locally or in regions so that it is curved radially outwards or inwards. The sub-portions can in particular be semicircle- or quarter-circle-shaped portions of the stiffening bead. It has been shown that a preferred improvement in stiffening can be achieved with correspondingly radially curved sub-portions close to the end points.

In this connection it can further be provided that the at least one curved sub-portion spans an inner circle segment which includes an angle of at least approximately 10° and at most approximately 30° and preferably of approximately 15°.

It can further be provided according to the invention that the stiffening bead has, close to at least one end point, at least two radially curved sub-portions with opposite curvatures. In other words it can be provided that the stiffening bead extends with a wavy or S-shaped portion close to at least one end point, wherein this portion can extend in particular within a circular ring segment. It can thereby preferably be provided that the stiffening bead, close to at least one end point, has three radially curved sub-portions, each of which has the opposite curvature to the adjacent sub-portion. For example, the sub-portion arranged closest to the end point can be curved radially outwards, the sub-portion adjacent thereto can be curved radially inwards, and the following third sub-portion can again be curved radially outwards. In the variants with a plurality of radially curved sub-portions close to the end points, it can generally be provided according to the invention that these sub-portions each span substantially equal inner circle segments.

A further development of the invention provides that the stiffening bead is formed with a substantially curvature-free middle portion. It can preferably be provided that the middle portion is arranged centrally between the end points along the course of the stiffening bead. It can further be provided according to the invention that the stiffening bead, starting from the curvature-free middle portion, extends with a curved course in the direction of the end points, in particular with a wavy course. The middle portion can additionally include an inner circle segment with an angle of approximately 60°. This further development has likewise been found to be particularly suitable for achieving the object according to the invention.

According to the invention it can further be provided that the stiffening bead is mirror-symmetrical with respect to a first axis of symmetry running through the center of the receiving opening. It has been shown that particularly even stress distribution within the end wall sections of the casing can be achieved with such a stiffening bead.

It can likewise be provided according to the invention that at least two stiffening beads are provided in the end wall section, which stiffening beads are arranged mirror-symmetrically with respect to a second axis of symmetry running through the center of the receiving opening, and in particular that the second axis of symmetry is arranged perpendicularly to the first axis of symmetry. The stress distribution within the end wall sections and the achievable stiffness can be improved still further by such an arrangement of the stiffening beads. According to this further development it can be provided, for example, that the geometric forms of the stiffening beads in the end wall section describe open, for example C-shaped, contours, wherein the C-shaped contours face towards one another or away from one another and lie on both sides of the receiving opening.

A further development of the invention provides that the diameter of the inner circle is determined by the dimensions of a receiving section, arranged in the region of the receiving opening, for a component for receiving a brake force or for releasing a brake force. The components for receiving a brake force or releasing a brake force can be fixed in known manner to the end wall sections of the casing. For example, the component for releasing a brake force can be in the form of a main brake cylinder arrangement which can be fixed in known manner to the booster casing by means of a fixing flange in the region of the receiving opening. According to the invention, the receiving section can correspond to a fixing portion of the associated component for receiving a brake force or for releasing a brake force that is to be received. Because the inner circle in this variant according to the invention is determined by the dimensions of the receiving section, it can be ensured that the stiffening beads are arranged at a distance from the receiving section and from the receiving opening that is advantageous for the stiffness of the casing.

In this connection it can further be provided according to the invention that the receiving region has at least one radial main direction of extension, and the stiffening bead extends substantially along this main direction of extension. For example, it can be provided that the main direction of extension runs linearly in the radial direction through the center of the receiving opening, and the stiffening bead extends between two end points substantially in the circumferential direction. The stiffening bead can thereby describe a course which for the most part and preferably at every point has a directional component parallel to the main direction of extension. In particular, it can be provided that the stiffening bead comprises a middle portion of the above-described type which extends substantially parallel to the main direction of extension.

It can further be provided according to the invention that the receiving section is provided with a bead which encircles the receiving region at least in part or surrounds it completely. It can thereby be provided according to the invention that the bead of the receiving section protrudes from the plane of the end wall section into the interior of the casing. In this connection it can further be provided that the stiffening bead protrudes, conversely, outwards from the plane of the end wall section. By providing an additional bead encircling the receiving section it is possible, in conjunction with a stiffening bead according to one of the variants described above, to achieve very good stiffness properties.

In a further development of the invention it is provided that the stiffening bead extends within an outer circle arranged concentrically with respect to the receiving opening. It can be provided in particular that the outer circle has a diameter that is between at least approximately 5 cm and at most approximately 20 cm larger than the inner circle. The inner circle and the outer circle accordingly define a circular ring around the receiving opening, in which the stiffening bead extends. The circular ring in particular determines the radial extension region of the stiffening bead. The stiffness of the casing can also be improved in the desired manner by this variant.

Other advantages of this invention will become apparent to those skilled in the art from the following detailed description of the preferred embodiments, when read in light of the accompanying drawings.

BRIEF DESCRIPTION OF THE DRAWINGS

FIG. 3 is a sectional view of a vacuum brake booster according to the prior art.

DETAILED DESCRIPTION OF THE INVENTION

Figure 2:
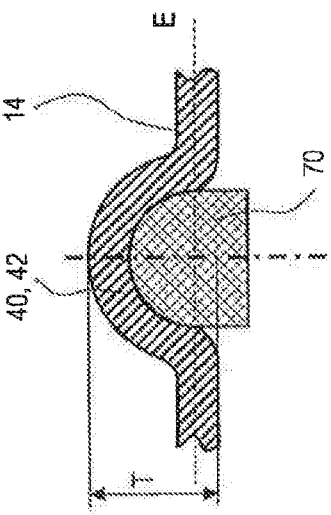
FIG. 2 is a schematic representation of the production process for providing the stiffening beads in the casing half of FIG. 1.

In FIG. 3, a vacuum brake booster according to a construction known from the prior art is shown in a longitudinal section containing an axis and is designated generally 10. The vacuum brake booster comprises a casing 12 with two end wall sections 14, which are connected to each other through a circumferential section 16. Receiving openings 18 are provided in the end wall sections 14, which receiving openings are arranged concentrically with respect to one another and in which components for receiving a brake force or for releasing a brake force can be received. On the right-hand side of the casing 12 in FIG. 3 there is shown a force input member 20, which is displaceable along an operating axis x by means of a brake pedal (not shown). The force input member 20, in conjunction with a valve arrangement 22 and a chamber arrangement 24, is able to transmit a brake force to a main brake cylinder arrangement (not shown in FIG. 3) arranged on the axially opposite end wall section 14. As discussed at the beginning, the chamber arrangement 24 has a working chamber 26 and a vacuum chamber 28, which are separated from one another by a movable separating wall 30.

In the case shown, the casing 12 is composed of two casing halves 13, which each have a circular base area portion forming the end wall sections 14. Starting therefrom, ring portions 32 are angled in the direction of the operating axis x and encircle the end wall sections 14 in the circumferential direction. The ring portions 32 are connected in a sealing manner to one another and also to the movable separating wall 30 in a connecting portion 34. The ring portions 32 and the connecting portion 34 thus form the circumferential section 16 of the casing 12.

There can also be seen in FIG. 3 two guide rods 15 for guiding the separating wall 30, which guide rods are received in opposite openings 36 in the end wall sections 14.

A preferred form of a casing 12 and in particular of an end wall section 14 of a casing half 13 according to an embodiment of the invention will be described in the following. For better understanding, the reference numerals introduced with reference to FIG. 3 will also be used in the description of this embodiment according to the invention for components which are the same or have the same effect. For reasons of clarity, features which are arranged in a plurality of locations and/or in a symmetrical manner within the depicted embodiment are not provided with their own reference numeral in each case.

Figure 1:
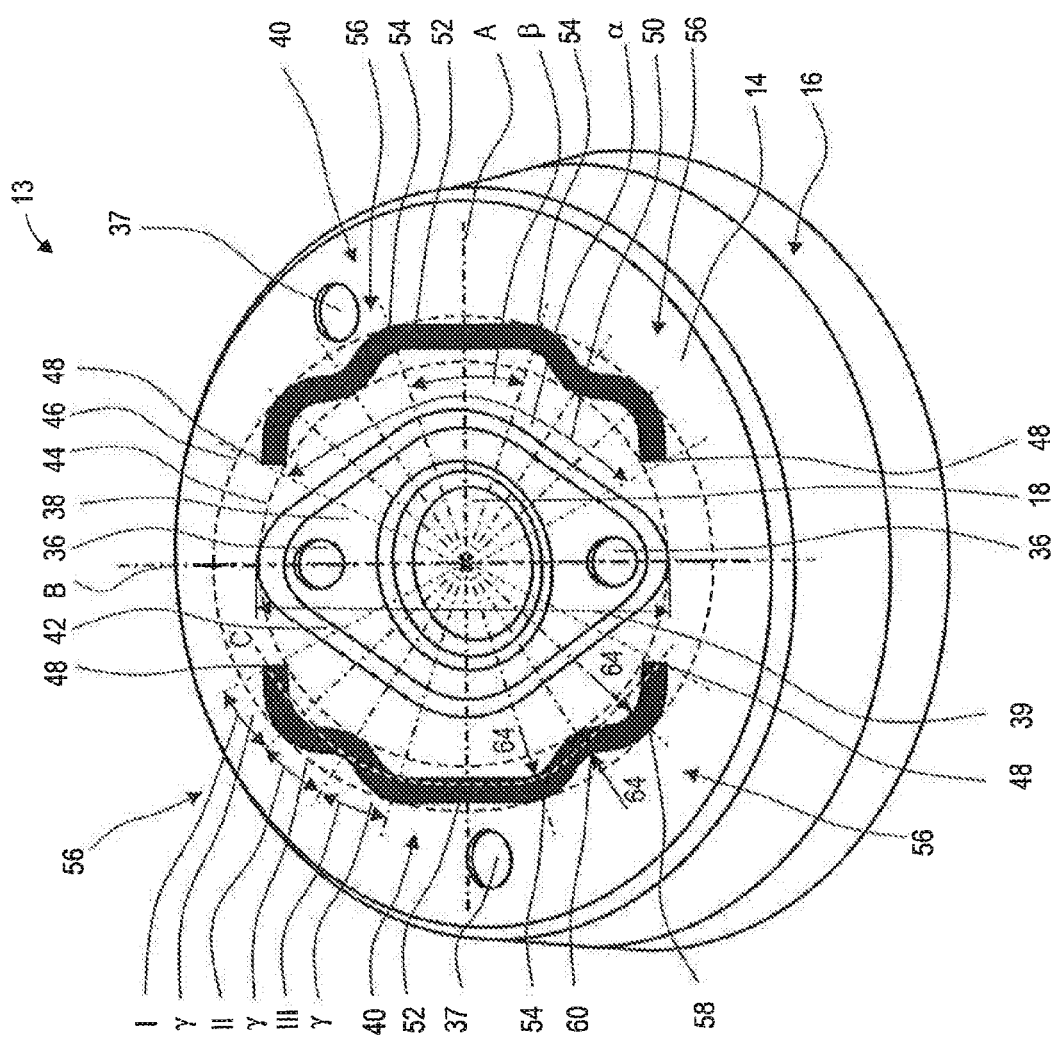
FIG. 1 is a perspective view of a casing half for a vacuum brake booster according to an embodiment of the invention.

FIG. 1 shows a casing half 13 for a vacuum brake booster 10 according to an embodiment of the invention. The casing half 13 has an end wall section 14 and a ring portion 16. In known manner, the end wall section 14 has a circular outline and the ring portion 16 is angled away from the end wall section 14 and extends in a transverse direction to the plane thereof. In the example shown, the end wall section 14 is substantially flat, with the exception of the bead arrangements 40, 42 described hereinbelow. Openings 36 for receiving guide rods 15 are also formed in the end wall section 14.

In its middle, the end wall section 14 has a receiving opening 18 which is arranged concentrically with respect to its circular outline. In the case shown, the end wall section 14, or the casing half 13, forms the part of the casing 12 that faces a component for releasing a brake force, so that components of a conventional main brake cylinder arrangement can be received in the receiving opening 18.

In the region of the receiving opening 18 there is formed a receiving section 38, in which a fixing flange (not shown) of a main brake cylinder arrangement can be received. The receiving section 38 comprises two openings 36, through which there pass guide rods 15 which have a protruding portion for the fixing of a main brake cylinder arrangement.

The receiving section 38 is substantially parallelogram-shaped and is surrounded by a bead 42 which extends in an analogous manner in a parallelogram shape around the receiving section 38. The circumferential bead 42 is in such a form that it protrudes from the plane of the end wall section 14 into the interior of the casing 12. In the case of FIG. 1, the circumferential bead 42 thus extends into the plane of the drawing.

The receiving section 38 further has a main axis of extension which defines a radial main direction of extension 39 of the receiving section 38. The dimensions of the receiving section 38 (or of the receiving section 38 together with the circumferential bead 42) along the main direction of extension 39 define the diameter of an inner circle 44 arranged concentrically with respect to the receiving opening 18.

Outside the inner circle 44, two stiffening beads 40 extend in the end wall section 14 and thereby protrude from the plane of the end wall section 14. The stiffening beads 40 are mirror-symmetrical with respect to one another, based on an axis of symmetry B, the axis of symmetry B running through the center of the receiving opening 18. The stiffening beads 40 are likewise each in themselves symmetrical with respect to an axis of symmetry A which runs through the center of the receiving opening 18 and is arranged perpendicularly to the axis of (mirror) symmetry B.

It will be seen in FIG. 1 that the stiffening beads 40 further extend within an outer circle 46, which is likewise arranged concentrically with respect to the receiving opening 18 and has a larger diameter than the inner circle 44. The inner circle 44 and the outer circle 46 thus define a circular ring in which the stiffening beads 40 extend.

The stiffening beads 40 each extend linearly between two end points 48. Furthermore, they run substantially in the circumferential direction and are formed without branches. In the case of FIG. 1, the stiffening beads 40 span an inner circle segment 50 which includes an angle α of 120°.

It will further be seen that the stiffening beads 40 have a course which is curved substantially radially outwards, wherein the radial axes of curvature (not shown separately) each extend, starting from the center of the receiving opening 18, along the axis of symmetry A. By extending between the end points 48 which are spaced apart in the circumferential direction, the stiffening beads 40 additionally describe an open contour. In the case shown, the stiffening beads 40 are formed substantially with a C-shaped contour.

It is further apparent from FIG. 1 that the stiffening beads 40 have a curvilinear course as they extend between the end points 48 and thereby extend along a longitudinal center axis C. The longitudinal center axis C is so arranged that the stiffening beads 40 extend in equal proportions above and below it (or in equal parts radially outside and inside said longitudinal center axis) and cross it several times. The longitudinal center axis C forms a circular arc segment between the outer circle 46 and the inner circle 44, wherein the circle belonging to the circular arc segment is again arranged concentrically with respect to the receiving opening 18.

The curvilinear course of the stiffening beads 40 is composed in the case shown of a curvature-free middle portion 52 intersected by the axis of symmetry A, which is followed at its outer end regions 54 in the circumferential direction by wavy extension regions 56 as far as the end points 48. The curvature-free middle portion 52 spans an inner circle segment which includes an angle β of 60°.

The wavy extension regions 56 have three sub-portions I, II and III which merge into one another in circumferential directions and each span an inner circle segment which includes an angle γ of 15°.

Starting from an end point 48, the first sub-portion I extends in the circumferential direction and curved radially outwards as far as a first point of inflection 58. The second sub-portion II extends from the first point of inflection 58 in the circumferential direction and curved radially inwards to a second point of inflection 60. This is followed by the third sub-portion III, which again extends in the circumferential direction and curved radially outwards and merges into the end region 54 of the middle portion 52, which forms a further point of inflection.

The sub-portions I, II and III thus form curved portions of the stiffening beads 40 which are curved about radial axes of curvature 64 shown in FIG. 1, and each is formed with the opposite curvature to its adjacent sub-portions. The sub-portions I, II and III also each form a quarter-circle-shaped extension region of the stiffening beads 40.

Overall, it will be seen from FIG. 1 that the stiffening beads 40 extend substantially along the main direction of extension 39 of the receiving section. The middle portions 52 in particular thereby extend parallel to the main direction of extension 39. Furthermore, the end points 48 of the stiffening beads 40 are so arranged that their radial spacing corresponds substantially to the radial dimension of the receiving section 38 along the main direction of extension 39. In other words, the end points 48 are arranged on or close to the inner circle 44.

FIG. 2 further shows schematically a production process for providing the stiffening beads 40, 42 from FIG. 1. A sub-section of the end wall section 14 is shown in a cross-sectional view, wherein the main plane E of the end wall section 14 runs perpendicularly to the plane of the drawing. A shaping tool 70 in the form of an embossing die will be seen, which embossing die is formed with a rounded contour on its side facing the end wall section 14. The shaping tool 70 is shown in a state in which it has been pressed into the end wall 14 and displaces the material of the end wall section 14 in a transverse direction out of the plane E of the end wall section 14. There is thereby formed a stiffening bead 40, 42 having a rounded cross-section corresponding to the contour of the shaping tool 70. This is semi-circular in the case shown. The stiffening bead 40, 42 further has the depth T shown in FIG. 2 relative to the plane E of the end wall section 14.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A vacuum brake booster for a vehicle brake device, comprising a casing with two axially opposed end wall sections which are connected to each other through a circumferential section,
wherein the end wall sections each have at least one receiving opening for receiving components for receiving a brake force or components for releasing a brake force,
wherein at least two stiffening beads are provided in at least one end wall section,
wherein each of the at least two stiffening beads extends outside of an inner circle which is arranged concentrically with respect to the receiving opening and spans an inner circle segment which includes an angle of at least 100° and at most 160°,
wherein each of the at least two stiffening beads has a course which is curved radially outwards.

2. The vacuum brake booster according to claim 1, wherein the at least two stiffening beads extends in a circumferential direction.

3. The vacuum brake booster according to claim 1, wherein the extension of the at least two stiffening beads describes an open contour.

4. The vacuum brake booster according to claim 1, wherein each of the at least two stiffening beads is without branches.

5. The vacuum brake booster according to claim 1, wherein each of the at least two stiffening beads extends with a curvilinear course along a longitudinal center axis.

6. The vacuum brake booster according to claim 5, wherein the longitudinal center axis forms a circular arc segment.

7. The vacuum brake booster according to claim 1, wherein each of the at least two stiffening beads is mirror-symmetrical with respect to a first axis of symmetry which runs through a center of the receiving opening.

8. The vacuum brake booster according to claim 7, wherein the at least two stiffening beads are arranged mirror-symmetrically with respect to a second axis of symmetry which runs through a center of the receiving opening.

9. The vacuum brake booster according to claim 8, wherein the second axis of symmetry is arranged perpendicularly to the first axis of symmetry.

10. The vacuum brake booster according to claim 1, wherein the diameter of the inner circle is determined by dimensions of a receiving section, arranged in the region of the receiving opening, for the components for receiving the brake force or the components for releasing the brake force.

11. The vacuum brake booster according to claim 10, wherein the receiving section has at least one radial main direction of extension and each of the at least two stiffening beads extends along the main direction of extension.

12. The vacuum brake booster according to claim 1, wherein each of the at least two stiffening beads extends within an outer circle arranged concentrically with respect to the receiving opening.

13. A vacuum brake booster for a vehicle brake device, comprising a casing with two axially opposed end wall sections which are connected to each other through a circumferential section,
wherein the end wall sections each have at least one receiving opening for receiving components for receiving a brake force or components for releasing a brake force,
wherein at least two stiffening beads are provided in at least one end wall section,
wherein each of the at least two stiffening beads extends outside of an inner circle which is arranged concentrically with respect to the receiving opening and spans an inner circle segment which includes an angle of at least 100° and at most 160°,
wherein each of the at least two stiffening beads extends between two end points, and is provided, close to at least one of the two end points, with at least one sub-portion which is curved about a radial axis of curvature,
wherein each of the at least two stiffening beads has, close to at least one of the two end points, at least two radially curved sub-portions with opposite curvatures.

14. A vacuum brake booster for a vehicle brake device, comprising a casing with two axially opposed end wall sections which are connected to each other through a circumferential section,
wherein the end wall sections each have at least one receiving opening for receiving components for receiving a brake force or components for releasing a brake force,
wherein at least two stiffening beads are provided in at least one end wall section,
wherein each of the at least two stiffening beads extends outside of an inner circle which is arranged concentrically with respect to the receiving opening and spans an inner circle segment which includes an angle of at least 100° and at most 160°,
wherein each of the at least two stiffening beads is formed with a curvature-free middle portion.

* * * * *